United States Patent
Watanabe et al.

(10) Patent No.: US 7,619,028 B2
(45) Date of Patent: Nov. 17, 2009

(54) DIENE RUBBER COMPOSITION AND PROCESS FOR PRODUCING THE SAME

(75) Inventors: Kazutake Watanabe, Syunan (JP); Osamu Yatabe, Syunan (JP); Takeshi Karato, Chiyoda-ku (JP); Yoshihiro Chino, Chiyoda-ku (JP); Takahiko Fukahori, Chiyoda-ku (JP)

(73) Assignees: Tokuyama Corporation, Yamaguchi (JP); Zeon Corporation, Tokyo (JP)

( * ) Notice: Subject to any disclaimer, the term of this patent is extended or adjusted under 35 U.S.C. 154(b) by 92 days.

(21) Appl. No.: 10/543,541

(22) PCT Filed: Jan. 30, 2004

(86) PCT No.: PCT/JP2004/000920

§ 371 (c)(1), (2), (4) Date: May 10, 2006

(87) PCT Pub. No.: WO2004/067625

PCT Pub. Date: Aug. 12, 2004

(65) Prior Publication Data

US 2007/0037916 A1    Feb. 15, 2007

(30) Foreign Application Priority Data

Jan. 31, 2003   (JP)   ................................ 2003-24978
Jan. 31, 2003   (JP)   ................................ 2003-24979

(51) Int. Cl.
*C08K 3/36*    (2006.01)
*C08J 3/16*    (2006.01)

(52) U.S. Cl. ........................ 524/492; 524/493; 524/847; 523/334; 523/333

(58) Field of Classification Search .............. 525/331.9, 525/342, 332.6; 524/492, 847, 493; 523/333, 523/334
See application file for complete search history.

(56) References Cited

U.S. PATENT DOCUMENTS

| | | | | |
|---|---|---|---|---|
| 3,122,518 A | | 2/1964 | Logemann et al. | |
| 3,922,240 A | * | 11/1975 | Berg et al. | 523/334 |
| 3,994,742 A | * | 11/1976 | Russell et al. | 106/491 |
| 4,366,285 A | | 12/1982 | Lukaschck et al. | |
| 6,025,428 A | * | 2/2000 | Day | 524/492 |
| 6,740,704 B2 | * | 5/2004 | Konno et al. | 524/572 |

FOREIGN PATENT DOCUMENTS

| | | |
|---|---|---|
| JP | 63-2886 | 1/1988 |
| JP | 2-199139 | * 8/1990 |
| JP | 3-252431 | 11/1991 |
| JP | 7-118449 | 5/1995 |
| JP | 10-231381 | 9/1998 |
| JP | 2001-213971 | * 8/2001 |
| JP | 2003-221402 | * 8/2003 |
| WO | WO 01/53386 | 7/2001 |

OTHER PUBLICATIONS

JP 2003-221402 (Aug. 2003) abstract and translation in English.*
JP 2001-213971 (Aug. 2001) abstract and translation in English.*

* cited by examiner

*Primary Examiner*—David Wu
*Assistant Examiner*—Rip A. Lee
(74) *Attorney, Agent, or Firm*—Westerman, Hattori, Daniels & Adrian, LLP

(57) ABSTRACT

The present invention is to provide a diene rubber composition and a cross-linked diene rubber thereof excellent in tensile strength, wear resistance and processability, keeping compatibility of both good fuel efficiency and high gripping property, and a production method thereof. What is characterized in the composition is that the composition is comprised of 100 parts by weight of a diene rubber having a molecular weight distribution expressed in terms of the ratio of the weight-average molecular weight to the number-average molecular weight of 1.1 to 30, 20 to 200 parts by weight of silica and a cationic polymer, and that a toluene-insoluble rubber content per gram of the silica within the range from 0.2 to 1 g, and diene cross-linked rubber thereof. What is characterized in the production method is that the method comprises steps of allowing rubber latex stabilized by an anionic emulsifying agent to react with an aqueous suspension of silica containing a cationic polymer and effecting co-coagulation of rubber in the rubber latex with the silica in the aqueous suspension within a specific pH range.

8 Claims, No Drawings

DIENE RUBBER COMPOSITION AND PROCESS FOR PRODUCING THE SAME

TECHNICAL FIELD

The present invention relates to a novel diene rubber composition and a process for producing same. More particularly, it relates to a diene rubber composition excellent in moldability and processability capable of producing a cross-linked rubber excellent in tensile strength and wear resistance, the cross-linked rubber and a process for the production of the cross-linked rubber.

BACKGROUND ART

From the past, carbon black and silica have widely been used as rubber-reinforcing fillers and, in general, a Banbury mixer, an open roll, a kneader and other kneading machines have been used extensively to incorporate the fillers into rubber by the dry process (also called the dry blending process).

In recent years, a silica-filled diene rubber composition has been found not only to be more freely colored, lower in environmental pollution and more excellent in tearing strength but also to enable compatibility of both fuel efficiency and high gripping property as compared with a carbon black-filled rubber composition, thus catching public attention as a rubber material for use in tire treads.

However, silica, the surface of which is covered with silanol groups, is strong in auto-agglutination but poor in affinity with diene rubber, thus making it difficult to attain a favorable dispersion into the rubber. A problem was that cross-linked rubber obtained by cross-linking a diene rubber composition filled with silica by the dry process was poor in reinforcing property such as tensile strength and wear resistance as compared with a cross-linked rubber obtained by cross-linking a carbon black-filled rubber composition.

In order to improve affinity of silica to the diene rubber, therefore, proposed are a method for incorporating the composition with a silane coupling agent according to the dry process (Reference 1 referred to) and a method wherein the composition is incorporated with a special rubber into which a functional group having affinity to silica has been introduced according to the dry process (Reference 2 referred to).

However, the composition obtained by the above methods was insufficient in improving affinity of the diene rubber to silica and not satisfactory in improving effect of the reinforcing property with the use of silica.

In general, there is a method for measuring a quantity of rubber content insoluble in toluene, i.e. a solvent giving a favorable solubility (hereinafter referred to as bound rubber) as an index for judging the affinity of the rubber with silica. It was found, however, that the above composition was very small in a quantity of such bound rubber, due to a low affinity of rubber with silica and other reasons.

As a method for increasing a quantity of the above bound rubber in the dry process, there is proposed the use of a special rubber obtained by copolymerization of three special monomers is followed by mixing with silica, thereby providing a rubber composition rich in the bound rubber (Reference 3 referred to).

However, the special rubber used in the above rubber composition is low in molecular weight distribution in terms of the ratio of weight-average molecular weight to number-average molecular weight (hereinafter also referred to as Mw/Mn) as ranging from 1.0 to less than 1.1, due to the process for production employed, and there is a room for improvement in processability and versatility.

In contrast to the dry process, there is also proposed a method for mixing an aqueous dispersion of silica with rubber latex to coagulate simultaneously silica and rubber particles in the dispersion, thereby obtaining a uniform coagulation product (so called co-coagulation).

Also publicly known are, for example, a rubber composition obtained by a method wherein an aqueous dispersion of silica having a mean particle size of 1 μm or smaller treated with a large quantity of a cationic polymer is mixed with rubber latex and a salt is added thereto to effect co-coagulation of the rubber with the silica (Reference 4 referred to) and a rubber composition obtained by a method wherein an aqueous dispersion of silica treated with a silane coupling agent is mixed with rubber latex and an acid is added thereto to effect co-coagulation of the rubber with the silica (Reference 5 referred to). These references did not refer to the amount of the bound rubber in the rubber composition.

The inventors have confirmed, however, that a relative content of the bound rubber to silica is extremely high or at least 1.1 g per gram of the silica in the rubber composition obtained according to the above methods. Thus, there may be possible problems that a rubber composition rich in the bound rubber improves, only to a small extent, the fuel efficiency and gripping property which are merits in using silica in cross-linked rubber produced by cross-linking of the composition, and the rubber composition itself is rendered excessively rigid, easily resulting in the formation of a gel-like product which is unbreakable during kneading. Thus, some room remains for improving processability in the course of kneading.

There is further proposed a method in which an aqueous dispersion of silica is mixed with rubber latex and an organic ionic compound is then added thereto to effect co-coagulation of rubber with silica (Reference 6 referred to). As is apparent from the subsequently-described Comparative Examples for tracing the above methods, it has been found that co-coagulation products obtained by these methods are unable to provide a sufficient affinity of rubber with silica and result in a smaller production of the bound rubber.

There is still further proposed a method in which rubber latex is mixed with an aqueous suspension of silica containing acrylamide/dimethylaminoethyl methacrylate copolymer to effect co-coagulation of rubber with silica (Reference 7 referred to). This reference also fails to describe a quantity of the bound rubber and it was difficult to produce the bound rubber in a sufficient quantity in case a common flocculating agent, acrylamide/dimethylaminoethyl methacrylate copolymer, was used.

Among the rubber compositions wherein silica has been incorporated into a diene rubber having a wide distribution of molecular weight such as SBR with versatile applications, a rubber composition containing the bound rubber in so moderate amount as to exhibit favorable physical properties has not yet been proposed hitherto, as described above.

(Reference 1) Japanese Published Unexamined Patent Application No. H3-252431

(Reference 2) Japanese Published Unexamined Patent Application No. S63-2886

(Reference 3) Japanese Published Unexamined Patent Application No. H7-118449

(Reference 4) Japanese Published Unexamined Patent Application No. 2001-213971

(Reference 5) Japanese Published Unexamined Patent Application No. H10-231381

(Reference 6) U.S. Pat. No. 3,122,518

(Reference 7) U.S. Pat. No. 4,366,285

DISCLOSURE OF THE INVENTION

In compositions comprising silica and a diene rubber having a wide distribution, therefore, it is an object of the present invention to provide a silica-containing diene rubber composition capable of affording a cross-linked rubber excellent in dispersion of silica, tensile strength and wear resistance with compatibility of both fuel efficiency and gripping property wherein the bound rubber is contained in a specific amount and processability is excellent even in molding.

The present inventors have made extensive research for solving the aforesaid technical problems. As a result, they have successfully obtained a cross-linked diene rubber composition excellent not only in tensile strength and wear resistance but also in excellent in processability in the course of molding by incorporating the bound rubber into a diene rubber composition in a moderate amount hitherto not attained in relation to silica followed by cross-linking the (diene rubber composition (hereinafter, the cross-linked rubber obtained by cross-linking the diene rubber composition is referred to simply as the cross-linked diene rubber composition). The present invention has been accomplished on the basis of the above research.

In accordance with the present invention, there is provided the diene rubber composition comprising 100 parts by weight of a diene rubber having a molecular weight distribution of 1.1 to 30 in terms of the ratio of weight-average molecular weight to number-average molecular weight (Mw/Mn), 20 to 200 parts by weight of silica and a cationic polymer wherein a toluene-insoluble rubber content is 0.2 to 1 g per gram of silica.

By the term "the toluene-insoluble rubber content" i.e. the bound rubber is meant a rubber component which is not extracted with toluene but remains when the rubber composition mixed with a filler but not subjected to cross-linking is extracted with toluene. The detailed extraction conditions will be described in the under-mentioned Example.

In accordance with the present invention, there is further provided a cross-linkable diene rubber composition wherein a cross-linking agent and a silane coupling agent have been incorporated into the diene rubber composition to impart cross-linkable property thereto as well as a cross-linked diene rubber wherein the cross-linkable diene rubber composition has been subjected to cross-linking.

In accordance with the present invention, there is still further provided a process for producing the diene rubber composition wherein the diene rubber, silica and a cationic polymer are used in a specific proportion and the composition is brought to co-coagulation by specific means, as a process capable of commercially producing the above diene rubber composition.

More precisely in this respect, the present invention provides a process for producing the diene rubber composition wherein silica and a cationic polymer are mixed in water to give an aqueous dispersion, then the aqueous dispersion is mixed with a diene rubber latex having the molecular weight distribution of 1.1 to 30 in terms of the ratio of weight-average molecular weight to number-average molecular weight to effect co-coagulation of the silica with the rubber, and the co-coagulation product is subjected to dehydration and drying.

BEST MODE FOR CARRYING OUT THE INVENTION (Diene Rubber)

In the present invention, any publicly known diene rubber may be used without any restriction, provided that the ratio of Mw/Mn is 1.1 to 30, preferably 1.2 to 20 or more preferably 1.4 to 15.

In case the diene rubber with Mw/Mn of less than 1.1 is used, the resultant cross-linkable rubber composition becomes poor in processability during kneading or molding and the cross-linked diene rubber is also decreased in wear resistance. In case the diene rubber with a ratio of Mw/Mn being 30 or greater is used, the cross-linked diene rubber is decreased in fuel efficiency and rigidity, particularly when used for tires.

The weight-average molecular weight (Mw) of the diene rubber in the present invention is preferably within a range from 5,000 to 2,000,000, more preferably 50,000 to 1,500,000 and most preferably 100,000 to 1,200,000 . Where the diene rubber having a weight-average molecular weight (Mw) within the above range is used, the cross-linked diene rubber of the present invention can be provided with reinforcing property such as fuel efficiency and wear resistance in a more favorably balanced fashion.

In case, a plurality of the diene rubbers having different molecular weight are used in mixture, the value of Mw/Mn may become greater than the original individual Mw/Mn values. Even in such case, the value is preferably within the range specified in the present invention.

A shape of the molecular weight distribution, i.e. an elution curve of the diene rubber obtained in gel-permeation chromatography may be of a single-peak pattern or multiple-peaks pattern.

The diene rubber having the above Mw/Mn may be produced without any particular limitation according to any known emulsion polymerization method or any known solution polymerization method. In the present invention, it is preferable to use a diene rubber produced by emulsion polymerization method from a conjugated diene monomer or a conjugated diene monomer and a monomer copolymerizable therewith. Such emulsion polymerization method can be carried out under known conditions.

Any extension oil usually used in rubber industries may be used as an extension oil to be used for collecting polymerized latex as rubber, including paraffin-derived, aromatic series-derived and naphthene-derived petroleum softening agents, vegetable oil-derived softening agents and fatty acids. In the case of the petroleum softening agents, it is preferable to have the polycyclic aromatic series, the content of which is less than 3%. This content is measured by the method of IP346 (an analytical method developed by The Institute Petroleum of the U.K.)

Illustrative of the conjugated diene monomers are, for example, 1,3-butadiene, 2-methyl-1,3-butadiene, 2,3-dimethyl-1,3-butadiene, 2-chloro-1,3-butadiene and 1,3-pantadiene. Among these monomers, preferable are 1,3-butadiene, 2-methyl 1,3-butadiene, and more preferable is 1,3-butadiene. These conjugated diene monomers may be used alone or in combination of two or more.

In addition, there is no particular limitation on monomers copolymerizable with the conjugated diene monomers. They include, for example, an amino group-containing vinyl monomer, a pyridyl group-containing vinyl monomer, a hydroxyl group-containing vinyl monomer, an alkoxyl group-containing vinyl monomer and an aromatic vinyl monomer. Among these, preferable is an aromatic vinyl monomer. Illustrative of the aromatic vinyl monomers are, for example, styrene, α-methylstyrene, 2-methylstyrene, 3-methylstyrene, 4-methylstyrene, 2,4-diisopropylstyrene, 2,4-dimethylstyrene, 4-t-butylstyrene. 5-t-butyl-2-methylstyrene, monochlorostyrene, dichlorostyrene, monofluorostyrene, N,N-dimethyl aminoethylstyrene and N,N-diethylaminoethylstyrene. Among these, styrene is particularly preferable. These copolymerizable monomers may be used alone or in combination of two or more.

The diene rubbers favorably used in the invention include, for example, natural rubber, isoprene rubber, butadiene rubber, styrene butadiene copolymer rubber, chloroprene rubber, isobutylene isoprene copolymer rubber, acrylonitrile butadiene copolymer rubber, styrene butadiene isoprene terpolymer rubber, butadiene isoprene copolymer rubber and acrylonitrile styrene butadiene copolymer rubber. Further, modified rubbers may be used in which functional groups such as hydroxyl groups, carboxyl groups, alkoxyl groups, amino groups and epoxy groups are introduced.

These diene rubbers may be used alone or in combination of two or more.

In the present invention, it is preferable to use styrene butadiene copolymer rubber having the styrene unit particularly within the range from 1 to 60% by weight, preferably 10 to 55% by weight, and more preferably 20 to 50% by weight for the purpose of providing a final cross-linked rubber with wear resistance and gripping property in a well-balanced fashion.

Further, Mooney viscosity (ML1+4, 100° C.) of the diene rubber is preferably within the range from 10 to 200 and most preferably 30 to 150.

(Silica)

There is no particular limitation on silica as long as it is added to rubber as a filler in this invention. Such silica includes, for example, precipitated silica produced by precipitating silica by neutralization of an alkali silicate with a mineral acid (so called the wet process), dry silica produced by allowing silicon tetrachloride to burn in an oxyhydrogen flame and a sol-gel process silica produced by hydrolyzing an alkoxide of silicon such as tetramethoxy silane and tetraethoxy silane in an acidic or alkaline aqueous organic solvent. Further, metal salt-enriched precipitated silica obtained according to the wet process wherein aluminum sulfate is used partially or totally for a mineral acid to effect a neutralization reaction may be used as precipitated silica.

Among the above silica products, it is preferable in the present invention to use precipitated silica excellent in rubber reinforcing property and productivity.

A more detailed explanation is made for the above precipitated silica. Namely, the specific surface area ($S_{BET}$) of the silica measured by a nitrogen adsorption process is preferably within a range from 70 to 300 m²/g, more preferably 80 to 280 m²/g and most preferably 90 to 260 m²/g.

Further, the specific surface area ($S_{CTAB}$) of the above silica measured by adsorption of cetyl trimethyl ammonium bromide (CTAB) is preferably within a range from 60 to 300 m²/g, more preferably 70 to 280 m²/g and most preferably 80 to 260 m²/g.

In addition, dibutyl phthalate oil absorption of the above silica (hereinafter simply referred to as the oil absorption) is preferably within a range from 100 to 400 mL100 g, more preferably 110 to 350 mL/100 g and most preferably 120 to 300 mL/100 g.

In the diene rubber composition of the present invention, silica is contained within a range from 20 to 200 parts by weight based on 100 parts by weight of the diene rubber, preferably in 30 to 150 parts by weight and more preferably 40 to 120 parts by weight. In case the composition is filled with silica in an amount of less than 20 parts by weight, the reinforcing property such as tensile strength and wear resistance of the resultant diene rubber composition and the cross-linked diene rubber are improved to a slight extent. Where the composition is filled with silica in an amount of 200 parts by weight or greater, the diene rubber composition is rendered excessively rigid, thus resulting in poor processability during kneading.

In case silica having the specific surface area and oil absorption within the above defines ranges is used in the present invention, the cross-linked diene rubber will be provided with particularly excellent reinforcing property such as tensile strength and wear resistance.

(Cationic Polymer)

In the present invention, the cationic polymer is needed to adjust the affinity of rubber with silica appropriately, thus allowing the bound rubber to be produced in a proper quantity in the resultant diene rubber composition.

Any polymer that is rendered cationic through ionization upon dissolution in water may be used without any limitation as the above cationic polymer. Representative of such polymers are, for example, those having amino groups (primary to tertiary) or their ammonium groups and quaternary ammonium groups on the main chain or side chain(s) of the polymer.

Illustrative of the cationic polymer are preferably polymers obtained by polymerization of monomers having primary to tertiary amino groups, ammonium salt groups and quaternary base groups. Besides, preferable are copolymers obtained by copolymerizing with other monomers so far as the above effect be not damaged.

In the present invention, the polymers obtained by polymerizing monomers having tertiary amino groups and quaternary ammonium groups in particular are preferable as they afford the diene rubber composition of better reinforcing property.

Illustrative of the favorable cationic polymers are, for example, polyethyleneimine, polyvinylamine, polyvinylpyridine, polyaminesulfone, polyallylamine, polydiallylmethylamine, polyamide amine, polyaminoalkyl acrylate, polyaminoalkyl methacrylate, polyaminoalkylacrylamide, polyepoxyamine, polyamide polyamine, polyesterpolyamine, dicyandiamide/formalin condensate, polyalkylenepolyamine/dicyandiamide condensate, epichlorohydrin/amine condensate, their ammonium salts and polymers having quaternary ammonium groups such as polydiallyldimethylammonium chloride and polymethacrylate ester methyl chloride.

Among these polymers, preferable are polydiallyl methylamine and its ammonium salt, epichlorohydrin/amine condensate and polydiallyldimethylammonium chloride.

The weight-average molecular weight of the above cationic polymer is preferably within the range from 1,000 to 1,000,000, more preferably 2,000 to 900,000 and most preferably 3,000 to 800,000. The weight-average molecular weight is rendered to 1,000 or greater, thereby improving the reinforcing property such as tensile strength and wear resistance of the cross-linked diene rubber. The weight-average molecular weight is rendered to 1,000,000 or less, thereby improving the silica dispersion in the rubber.

Further, cation-equivalent molecular weight of the above cationic polymer is preferably within the range of 220 or lower, more preferably 200 or lower and most preferably 180 or lower.

(Quantity of the Cationic Polymer Used)

It is favorable in the diene rubber composition of the present invention that the above cationic polymer should be used within the range from 0.1 to 7.5 parts by weight, preferably 0.5 to 7 parts by weight and more preferably 1 to 6 parts by weight for 100 parts by weight silica, whereby the production of the bound rubber can be easily adjusted to an appropriate quantity as described above.

In other words, where the above cationic polymer is used in an amount of less than 0.1 parts by weight, it may be difficult to produce the bound rubber in the diene rubber composition in the under-mentioned process, decreasing the quantity of the bound rubber and resulting in a tendency to deteriorate the reinforcing property such as tensile strength and wear resistance of the cross-linked diene rubber. In contrast, where the cationic polymer is used in a quantity exceeding 7.5 parts by weight, the bound rubber is produced excessively to tend to lower the processability of the cross-linked diene rubber during kneading and affects fuel efficiency. Further, where the cationic polymer is used excessively on co-coagulation of the diene rubber latex with silica, some of the rubber fails to incorporate silica thereinto so that an entire coagulation may occur to cause uneven distribution of silica in the rubber.

In case processability and fuel efficiency are particularly taken into account in the invention, it is preferable to use silica of the specific surface area ($S_{CTAB}$) ranging from 80 to 200 m$^2$/g. In this case, a favorable amount of the cationic polymer is so adjusted that the proportion of the cationic polymer may satisfy the following formula wherein S represents the specific surface area of the silica (unit: m$^2$/g) measured by the cetyl trimethyl ammonium bromide (CTAB) adsorption method and c represents a proportion (unit: part by weight) of the cationic polymer for 100 parts by weight of the silica.

$$27 \leq (S/c) \leq 70.$$

In a series of studies about the diene rubber composition, the present inventors have found that a proportion of the cationic polymer is important in improving the affinity of the rubber with silica to produce the bound rubber in a proper amount and that an optimal proportion is uniquely related to the specific surface area of the silica used. On the basis of this finding, it has been found also that incorporation of an optimal cationic polymer can attain a favorable dispersion of silica in the rubber composition without causing deterioration in processability of the resultant rubber composition even if no or a little silane coupling agent or the like are used.

(Bound Rubber)

The diene rubber composition of the present invention is best characterized in that the bound rubber is in an amount of 0.20 to 1.0 g, preferably 0.30 to 0.90 g and more preferably 0.35 to 0.80 g per gram of silica in the diene rubber and silica system.

A quantity of the bound rubber has been used hitherto as a yardstick for assessing dispersibility of a filler into the rubber. As described above, the present invention has for the first time provided a composition in which the bound rubber is produced in a proper amount in a composition in which silica is incorporated into a diene rubber having a wide molecular weight distribution, like diene rubber with versatile applications.

The amount of the bound rubber is adjusted within the above-described range, thereby making it possible to provide the diene rubber composition, which is excellent in moldability when not yet crossed-linked, exhibiting excellent physical property such as tensile strength and wear resistance when cross-linked to give the cross-linked rubber and also exhibiting effects not attainable by conventional diene rubber compositions.

In case the bound rubber is in an amount of less than 0.20 g per gram of silica, the reinforcing property such as tensile strength and wear resistance of the cross-linked diene rubber are improved to a slight extent. In case it is in an amount exceeding 1.0 g, the processability of the diene rubber composition is deteriorated and where the cross-linked diene rubber is used for tires, the improvement in fuel efficiency and gripping property becomes poor.

As to the mechanism of the bound rubber existing within the above range in the diene rubber composition of the present invention, it is the inventors' assumption that the cationic polymer is attached onto the surface of silica according to the below-mentioned production process but is unable to cover the surface of silica densely due to the magnitude or the molecular weight thereof so as to impart moderate affinity to the rubber thereby controlling the amount of the bound rubber produced. It is also the inventors' assumption that diene rubber composition having the bound rubber in a given amount is obtained by controlling the production amount of the bound rubber by adjusting the amount of the cationic polymer used and the specific surface area as well as the particle size of silica.

In the case of the composition described in the Patent Reference 5 in which silica treated with the above-described silane coupling agent is used, it is difficult to control the production quantity of the bound rubber because the silane coupling agent covers the surface of silica densely. Further, in the case of the composition described in the Patent Reference 4 in which silica treated with the cationic polymer and having a particle size of 1 µm or lower is used, it is difficult to control the production quantity of the bound rubber due to a smaller particle size of the silica. Neither of these compositions attained the object of the invention because of an excessively larger amount of the bound rubber in the resultant diene rubber composition.

However, the diene rubber composition of the present invention does not completely deny a combined use with the silane coupling agent and allows the presence of the silane coupling agent within the range where the production of the bound rubber by the cationic polymer is predominant. In general, the silane coupling agent is preferably in 5 parts by weight or lower for 100 parts by weight of silica and most preferably in 3 parts by weight or lower.

The diene rubber composition of the present invention is mixed with a cross-linking agent to give a cross-linkable diene rubber composition, which is molded and then cross-liked to manufacture cross-linked diene rubber.

(Cross-linkable Rubber Composition)

The cross-linkable rubber composition of the invention is not particularly limited regarding the production method but may be produced according to any ordinary method. The diene rubber composition of the present invention may be incorporated, for example, with fillers such as a silane coupling agent, carbon black, talc, clay, calcium carbonate, or cross-linking agents, cross-linking promoting agents, cross-linking activators, antioxidants, activating materials, process oils, plasticizers, smoothing agents, and other fillers in a necessary amount and kneaded by the aid of a roll or Banbury mixer to give a cross-linkable rubber composition. The fillers may include rubber such as a diene rubber for dilution, whenever necessary.

Illustrative of the diene rubber for dilution are, for example, natural rubber (NR), polyisoprene rubber (IR), emulsion polymerization styrene butadiene copolymer rubber (SBR), solution polymerization random SBR (bound styrene, 1-50% by weight; 1,2-linkage content of butadiene moiety, 8-80%), high-trans SBR (trans linkage content of butadiene moiety, 70-95%), low-cis polybutadiene rubber (BR), high cis BR, high-trans BR (trans linkage of butadiene moiety, 70-95%), styrene isoprene copolymer rubber, butadiene isoprene copolymer rubber, styrene butadiene isoprene terpolymer rubber, styrene acrylonitrile/butadiene terpolymer rubber and acrylonitrile/butadiene copolymer rubber. These diene rubbers may be properly selected depending on the requirement. These diene rubbers may be used alone or in combination of two or more. Further, the rubber component may include polyether rubbers such as acrylic rubber and epichlorohydrin rubber, or fluorocarbon rubbers, silicon rubbers, ethylene propylene diene rubbers and urethane rubbers.

In the present invention, when the cross-linkable rubber composition is incorporated with a silane coupling agent, the resultant cross-linked diene rubber is further favorably improved for fuel efficiency, reinforcing property and wear resistance.

Illustrative of the silane coupling agents are, for example, vinyltriethoxysilane, β-(3,4-epoxycyclohexyl)ethylmethoxysilane, N-(β-aminoethyl)-γ-aminopropyltrimethoxysilane, bis (3-(triethoxysilyl)propyl)tetrasulfide, bis (3-(triethoxysilyl)propyl)disulfide, and tetrasulfides such as γ-trimethoxysilylpropyldimethylthiocarbamyl tetrasulfide and γ-trimethoxysilylpropylbenzothiazyl tetrasulfide as described in Japanese Published Unexamined Patent Application No. H6-248116. It is preferable that silane coupling agents have 4 or more sulfur atoms in one molecule to avoid any scorching in the course of kneading. These silane coupling agents may be used alone or in combination of two or more.

The silane coupling agents may be incorporated preferably in an amount of 1 to 20 parts by weight for 100 parts by weight of silica, more preferably 0.5 to 15 parts by weight and most preferably 1 to 10 parts by weight.

Examples of the carbon black include furnace black, acetylene black, thermal black, channel black and graphite. Among these, furnace black is preferable, for example such as SAF, ISAF, ISAF-HS, ISAF-LS, IISAF-HS, HAF, HAF-HS, HAF-LS and FEF.

These carbon blacks may be used alone or in combination of two or more, and are incorporated into the rubber normally in an amount of 150 parts by weight or less based on 100 parts by weight of the rubber. A preferable total quantity of carbon black and silica is 20 to 200 parts by weight.

There is no particular limitation on BET specific surface area of the above carbon black, which is preferably within the range from 30 to 200 m$^2$/g, more preferably 50 to 150 m$^2$/g and most preferably 70 to 140 m$^2$. The oil absorption of the above carbon black is preferably within the range from 30 to 300 mL/100 g, more preferably 50 to 200 mL/100 g and most preferably 80 to 160 mL/100 g.

Examples of the Cross-linking agents include sulfurs such as powdery sulfur, precipitated sulfur, colloidal sulfur, insoluble sulfur and highly dispersed sulfur, halogenated sulfurs such as sulfur monochloride and sulfur dichloride, organic peroxides such as dicumyl peroxide and di-t-butyl peroxide, quinonedioximes such as p-quinonedioxime and p,p-dibenzoylquininedioxime, organic polyvalent amine compounds such as triethylenetetramine, hexamethylenediamine carbamate and 4,4'-methylnebis-o-chloroaniline, and alkyl phenol resins having the methylol group. Among these compounds, sulfur is preferable and powdery sulfur is particularly preferable. These cross-linking agents may be used alone or in combination of two or more.

The cross-linking agent is incorporated into the diene rubber component in an amount preferably within the range from 0.1 to 15 parts by weight, more preferably in 0.3 to 10 parts by weight and most preferably in 0.5 to 5 parts by weight per 100 parts by weight of the diene rubber component. Excellent fuel efficiency and reinforcing property can be achieved when the cross-linking agent is in this range.

Illustrative of the cross-linking promoting agents are sulfenamide based cross-linking promoting agents such as N-cyclohexyl 2-benzothiazylsulfenamide, N-t-butyl-2-benzothiazolesulfenamide, N-oxyethylene-2-benzothiazolesulfenamide and N,N-di-isopropyl-2-benzothiazolesulfenamide, guanidine based cross-linking promoting agents such as diphenyl guanidine, diorthotolyl guanidine and orthotolyl biguanidine, thiourea based cross-linking promoting agents such as diethylthiourea, thiazole based cross-linking promoting agents such as 2-mercaptobenzothiazole, dibenzodithiazyl sulfide and 2-mercaptobenzothiazole zinc salt, thiram based cross-linking promoting agents such as tetramethylthiram monosulfide, tetramethylthiram disulfide, diethyldithiocarbamate based cross-linking promoting agents such as sodium dimethyldithiocarbamate and zinc diethylthiocarbamate, and xanthogenate based cross-linkage promoting agents such as zinc isopropylxanthogenate and zinc butylxanthogenate.

These cross-linking promoting agents may be used alone or in combination of two or more. The sulfenamide-based cross-linking promoting agents are particularly preferable.

The cross-linking promoting agent is incorporated with the diene rubber component in an amount preferably within the range from 0.1 to 15 parts by weight, more preferably in 0.3 to 10 parts by weight and most preferably in 0.5 to 5 parts by weight with 100 parts by weight of the diene rubber component.

There is no particular limitation on the cross-linking activating agents. Higher fatty acids such as stearic acid and zinc oxides may be used. The zinc oxide are preferably those having a higher surface activity and a particle size of 5 μm or less, including active Chinese white having a particle size of 0.05 to 0.2 μm and Chinese white having a particle size of 0.3 to 1 μm. Usable are zinc oxides surface-treated with an amine-based dispersing agent or a wetting agent. These cross-linking activating agents may be used alone or in combination of two or more.

The proportion of the cross-linking activating agent is properly selected according to a type of the cross-linking activating agent. The proportion of the higher fatty acid is preferably within the range from 0.05 to 15 parts by weight based on 100 parts by weight of the diene rubber component, more preferably 0.1 to 10 parts by weight and most preferably in 0.5 to 5 parts by weight. The proportion of the zinc oxide is preferably within the range from 0.05 to 10 parts by weight based on 100 parts by weight of the diene rubber component, more preferably in 0.1 to 5 parts by weight and most preferably in 0.5 to 3 parts by weight.

Other additives include active materials such as diethylene glycol, polyethylene glycol and silicon oil, fillers such as clay, aluminum hydroxide and starch, and waxes.

There is no limitation on the process for producing the cross-linkable rubber composition of the present invention. For example, a process wherein additives excluding the cross-linking agent and the cross-linking promoting agent are mixed and kneaded with the diene rubber composition of the present invention and the thus prepared product is then mixed with the cross-linking agent and the cross-linking promoting agent to give a cross-linkable rubber composition. The incorporating components excluding the cross-linking agent and the cross-linking promoting agent are mixed with the diene rubber composition preferably for the period of 30 seconds to 30 minutes. Further, the kneading temperature is preferably at 80° C. to 200° C., more preferably at 100° C. to 190° C., and most preferably at 140° C. to 180° C. The cross-linking agent is incorporated with the cross-linking promoting agent after cooling down normally to 100° C. or lower and preferably to 80° C. or lower.

Additional incorporation of the silane coupling agent into the cross-linkable rubber composition of the present invention further improves the affinity of the rubber with silica and increases the amount of the bound rubber, as compared with a case where no silane coupling agent is included. However, such bound rubber exhibits much more excellent property when incorporated into the cross-linkable rubber composition, as compared with a case where only a silane coupling agent is used to effect co-coagulation, thereby giving a similar quantity of the bound rubber to the diene rubber composition.

This finding can be confirmed as a difference in the effect due to a fact that the diene rubber composition of the present invention contains the bound rubber produced in the existence of the cationic polymer.

It is preferable in the present invention that the above-described cross-linkable rubber composition after incorporation of the silane coupling agent is adjusted for incorporated amount, kneading temperature and kneading time of the silane coupling agent so that the bound rubber can be incorporated within the range from 0.30 to 1.20 g per gram of silica (gram per gram of silica), preferably in 0.35 to 1.10 and more preferably in 0.40 to 1.00.

(Cross-linked Diene Rubber)

In the present invention, there is no particular limitation on the process for producing the cross-linked diene rubber by molding and then cross-linking the above cross-linkable rubber composition. Any appropriate process can be selected according to the shape and size of the substance to be cross-linked. Such process may be acceptable where the cross-linkable rubber composition is charged into a mold is heated to attain cross-linking at the same time with molding or the rubber composition pre-molded but not yet cross-linked is heated to effect cross-linking. The cross-linking temperature is preferably at 120 to 200° C. and more preferably at 140 to 180° C., while the cross-linking time is usually for 1 to 120 minutes.

(Process for Producing the Diene Rubber Composition)

There is no limitation on the process for producing the diene rubber composition of the present invention. Most preferable is a process wherein silica and the cationic polymer are mixed in water to form an aqueous dispersion, which is then mixed with latex (rubber latex) of the diene rubber having the above described molecular weight distribution, whereby co-coagulation of silica with the rubber takes place, followed by dehydration and drying to obtain the diene rubber composition.

The concentration of the rubber in the above rubber latex is not particularly limited but may be selected properly according to the object and the intended use concerned. Usually, the concentration is preferably 5 to 80% by weight. Further, the latexes stabilized by an anionic emulsifying agents, a non-ionic emulsifying agents or a cationic emulsifying agents may be used as the above rubber latex. Among these, it is preferable to use rubber latexes stabilized with an anionic emulsifying agents. Namely, the cationic polymer reacts with the anionic emulsifying agent to cause a partial or entire coagulation of the rubber with silica, whereby the rubber is uniformly filled with silica, and the rubber composition having the bound rubber in an optimal quantity in relation to silica tends to be obtained.

Preferable anionic emulsifying agents are, for example, salts of long-chain fatty acid having a carbon number exceeding 10 and/or rosin acid salts. Concrete examples include potassium salts or sodium salts of fatty acids such as capric acid, lauric acid, myristic acid, palmitic acid, oleic acid and stearic acid.

Usually, the silica in the aqueous dispersion thereof is preferably at a concentration of 1 to 40% by weight.

In particular, the silica obtained by neutralization reaction of an alkali silicate with an acid is dispersed into water in the form of a slurry or a wet cake and preferably used as an aqueous dispersion of the silica without drying.

There is no particular limitation on a method for mixing the rubber latex with the aqueous dispersion of silica, and the aqueous dispersion of silica may be added to the rubber latex or vice versa. Further, the aqueous dispersion of silica may be mixed with the rubber latex at the same time.

The co-coagulation of the diene rubber with silica may be completed for coagulation of the rubber by the action of the cationic polymer, but acids, for example, inorganic acids such as sulfuric acid, phosphoric acid and hydrochloric acid; organic acids such as formic acid, acetic acid and butyric acid; Lewis acid such as aluminum sulfate, as well as salts such as sodium chloride and calcium chloride may be used for completing coagulation of the rubber, whenever necessary.

(Method for Adjusting or Modifying the Bound Rubber)

In the above process, there is no limitation on a method for adjusting the amount of the bound rubber contained in the resultant diene rubber composition. Typical factors affecting the amount of the bound rubber include the specific surface area and the particle size of the silica used. In other words, the higher the specific surface area of silica and the smaller the particle size, the more the production of the bound rubber will be. Therefore, the specific surface area and the particle size of the silica used are appropriately adjusted so that a amount of the bound rubber can fall into the above-described range. To be more specific, the precipitated silica is preferable, and the specific surface area ($S_{BET}$) thereof is preferable within the range from 70 to 300 m²/g, more preferably 80 to 280 m²/g and most preferably 90 to 260 m²/g.

An average particle size of the silica used at the time of the co-coagulation is within the range from 1 to 40 μm (excluding 1 μm or lower) and preferably 10 to 30 μm.

A process of adjusting the particle size of silica used for the co-coagulation within the above range may be carried out anywhere so as far as it is before the co-coagulation. There is no particular limitation on the adjustment method, and any known method can be used for this purpose. For example, usable is a dry pulverization method in which a jet mill, a ball mill, a nara mill, a micro mill or like is used to make an appropriate adjustment so as to obtain a desired particle size or a wet pulverization method in which a disper, a homogenizer, a high-pressure homogenizer, a colloid mill or the like used to make an appropriate adjustment so as to obtain a desired particle size. Further, in case the wet pulverization method is employed to adjust the particle size of silica, adjustment may be made in water, an organic solvent, rubber latex or a mixture of these.

Another typical factor affecting the amount of the bound rubber is the amount of the cationic polymer used. Namely, the amount of the bound rubber produced will increases as the amount of the cationic polymer is increased. To be more specific, the cationic polymer is preferably within the range of 0.1 to 7.5 parts by weight based on 100 parts by weight of silica. In particular, it is favorable due to the aforesaid reason that the cationic polymer is adjusted for the amount used in such way that the cationic polymer can be incorporated so as to satisfy the following formula wherein S stands for the specific surface area of the silica (unit: m²/g) measured by CTAB and c for an incorporated amount (unit: part by weight) of the cationic polymer based on 100 parts by weight of the silica.

$$27 \leq (S/c) \leq 70$$

In case the diene rubber latex stabilized by an anionic emulsifying agent is used in the present invention is used, the pH of the reaction system wherein the rubber latex is reacted with the aqueous dispersion of silica and the cationic polymer is kept within the range from 5 to 11 while effecting the co-coagulation. This will be favorable in making a particle size of the resultant co-coagulation product larger and facilitating the subsequent filtration and drying steps.

The term "the reaction system" referred to in the present invention means a system in such state where the aqueous dispersion of silica and the cationic polymer is mixed with the diene rubber latex stabilized by an anionic emulsifying agent.

The inventors have conducted a series of researches about the mechanism of co-coagulation reaction between the diene rubber latex stabilized by the anionic emulsifying agent and the aqueous dispersion of silica and the cationic polymer. As a result, it has been found that the pH of the co-coagulation reaction system gives a great influence on the particle size of the co-coagulation product. More particularly, when the pH of the above reaction system is adjusted to an acidic range or less than 5, the co-coagulation product is produced in a smaller particle size. In contrast, when the pH of the reaction system is adjusted to 5 or greater, in particular 6 or greater, the co-coagulation product is produced in a greater particle size, thus resulting in a greatly improved filtration performance. It is also possible to obtain the diene rubber composition in which silica has uniformly been dispersed into the resultant co-coagulation product.

Heretofore, there has been no case where the co-coagulation is effected in the reaction system at pH 5 or higher, and hence this fact has been found for the first time by the present inventors.

It is not preferable to keep an upper limit of pH of the reaction system excessively high with a view to preventing re-dissolution of silica and carrying out the co-coagulation reaction effectively. It is recommended to keep pH at 11 or less and preferably at 10 or less.

There is no particular limitation on the method for conducting the co-coagulation while maintaining pH of the reaction system at 5 to 11. Favorable is a method in which an acid or an alkali is added to the aqueous dispersion of silica and the cationic polymer, whenever necessary, to adjust the pH so as to fall within the above range and then the diene rubber latex stabilized by the anionic emulsifying agent is gradually added under agitation, or an embodiment wherein the aqueous dispersion of silica and the cationic polymer is added to the diene rubber latex stabilized by an anionic emulsifying agent while maintaining pH within the above range. Also favorable is an embodiment in which the diene rubber latex stabilized by an anionic emulsifying agent and an aqueous dispersion of silica and the cationic polymer are mixed at the same time while the pH is kept within the above range, in case consideration is given to a continuous coagulation process. Among these, the embodiment in which the diene rubber latex stabilized by the anionic emulsifying agent and the aqueous dispersion of silica and the cationic polymer are mixed at the same time while the pH is kept within the above range is most preferable in easily controlling pH of the reaction system to a definite value and making uniform the particle size of the resultant co-coagulation product.

At the time of adjusting the pH within the above range, there may be the case where the pH of the diene rubber latex stabilized by the anionic emulsifying agent exceeds the above range. However, such temporal deviation from the upper limit may be acceptable because the co-coagulation proceeds slowly at such pH.

It is also possible that an acid and a salt are used conjointly to effect the co-coagulation so far as the pH of the above reaction system is kept within the range of 5 to 11. It is preferable to use the acid and salt in combination and effect co-coagulation, particularly in an embodiment in which an aqueous dispersion of silica and the cationic polymer are added to the above diene rubber latex while keeping the pH within the above range and an embodiment in which the diene rubber latex and an aqueous dispersion of silica and the cationic polymer are added at the same time, because the particle size of the resultant co-coagulation product becomes greater to improve the filtration performance. A pH value at the time of completion of coagulation is preferably within the range of 5.0 to 8.0, more preferably 5.0 to 7.5 and most preferably 5.0 to 7.0.

In the present invention, there is no particular limitation on temperature of the reaction system, but the temperature is preferably at 20 to 80° C. In general, the reaction system may be preferably mixed by way of an ordinary dispersion equipment such as a propeller blade, a dispersion mixer, a homogenizer, and the like.

(After-treatment)

There is no particular limitation on individual steps such as filtration, washing, dehydration and drying for a solid component of the diene rubber and silica (hereinafter referred to as cram) obtained by the co-coagulation, and each step can be favorably carried out by any ordinary method. Acceptable is a process wherein the cram obtained by separation of a liquid component (hereinafter referred to as ceram) is washed with water, filtered, and then removed of water by the aid of a squeezer or the like to effect dehydration, pulverized in granular form, dried by the aid of an extrusion dryer or a hot blast dryer, and molded into pellets or blocks. There is another method in which the cram can be made powdery by spray drying, without separation into the cram and the ceram.

EXAMPLES

The present invention will now be illustrated in more detail by way Examples and Comparative Examples. It is to be construed however that the present invention is not limited by these Examples. The various physical properties described in the Examples and Comparative Examples were measured by the following methods. "Parts" is shown by "parts by weight".

(1) Mean Particle Diameter of Silica

A light-scattering diffraction-type particle distribution measuring equipment (Coulter LS-230 made by Coulter Inc.) was used to measure the median diameter based on volume. This value was adopted as a mean particle diameter.

(2) Specific Surface Area

Measurement of the specific surface area ($S_{BET}$) according to the nitrogen adsorption method:

A wet cake of silica was dried in a dryer (120° C.) and then measured for nitrogen adsorption by the aid of ASAP 2010 (made by Micro-Meritec Inc.). The value obtained by one spot method at relative pressure of 0.2 was adopted.

Measurement of the specific surface area ($S_{CTAB}$) according to the adsorption of cetyltrimethylammonium bromide (CTAB):

After a wet cake of silica was dried in a dryer (120° C.), the specific surface area was measured in accordance with the method described in ASTM D3765-92. However, the method described in ASTM D3765-92 was a method for measuring $S_{CTAB}$ of carbon black and so modified to some extent. More particularly, ITRB (83.0 m²/g), a standard sample of carbon black, was not used, but CTAB standard solution was prepared separately and used to standardize aerosol OT solution by which the adsorbed cross section for one molecule of CTAB in relation to the surface of silica was defined to be 35 square angstrom and the specific surface area was calculated by referring to the adsorption of CTAB. This is because carbon black is different from silica in the state of surface and the adsorption of CTAB may vary even at the same specific surface area.

(3) Oil Absorption

The absorption was measured in accordance with JIS K6220.

(4) Unit Quantity of Styrene in Copolymer:

This was measured in accordance with JIS K6383 (Refractive index).

(5) Mooney Viscosity

A Mooney viscosity meter (VR-103ST made by Ueshima Seisakusho Co., Ltd.) was used to make measurement at 130° C.

(6) Silica Content

A thermal analysis equipment TG/DTA (TG/DTA 320 made by Seiko Instruments Inc.) was used to measure the remaining percentage of a dry specimen after thermal decomposition in air and the weight reduction percentage up to 150° C. These values were used to calculate silica content by referring to the following formula. The content was converted into amount (part by weight) for 100 parts by weight of rubber and given in the Examples. The measurement was performed under the conditions: temperature raising rate in air, 20° C./min; set temperature, 600° C. and holding time at 600° C., 20 minutes.

Silica content (% by weight)=residue on ignition/
[100−(reduction percentage down to 150° C.)]×
100

(7) Toluene-Insoluble Rubber Content (Bound Rubber) Per Gram of Silica 0.2 g of dry specimen was cut into about 2 mm square, placed in a stainless-steel wire cage (280 mesh, opening of 53 μm), submerged into 60 mL of toluene and allowed to stand at 23° C. for 72 hours. After the lapse of 72 hours, the cage was taken out, washed with acetone, vacuum-dried at 40° C. for 12 hours to measure the weight, from which toluene insoluble content was determined. A toluene-insoluble rubber content per gram of silica (gram per gram of silica) was calculated by the following formula;

Toluene-insoluble rubber content per gram of silica
(gram per gram of silica)=[(Toluene-insoluble
content (g)−silica content in the specimen (g)/
silica content in specimen (g))]

The silica content in the above specimen was calculated on the basis of the value obtained from silica content of the above (6). In the cross-linkable diene rubber composition, there is a case where solids other than silica and Chinese white may be present in the toluene insoluble content. In such a case, the silica content was calculated by deducting solid contents other than silica determined by the added ratio from the toluene insoluble content.

(8) 300% Modulus, Tensile Strength and Elongation

They were measured in accordance with the tensile stress test method described in JIS K6253.

(9) Wear Resistance

An Akron type wear tester was used to calculate the wear resistance index by referring to the weight reduction after 1000-time preliminary frictions and that after 1000-time full-scale frictions. A greater wear resistance index showed a better wear resistance.

(10) Gripping Property (tan δ at 0° C.)

A dynamic viscoelastic analyzer ARES (made by Reometrics Inc.) was used to measure tan δ at 0° C. under the conditions of strain, 0.2% and frequency, 15 Hz. A greater tan δ (0° C.) showed a better gripping property.

(11) Fuel Efficiency (tan δ at 60° C.)

A dynamic viscoelastic analyzer ARES (made by Reometrics Inc.) was used to measure tan δ at 60° C. under the conditions of strain 0.2%, and frequency 15 Hz. A smaller tan δ (60° C.) showed a better fuel efficiency.

(12) Data on Molecular Weight

In data on molecular weight of the polymer, gel-permeation chromatography (GPC) was carried out to obtain the weight average molecular weight (Mw) and molecular weight distribution (Mw/Mn) in terms of a standard polystyrene conversion. This GPC was carried out by using HLC-8020 (made by Tosoh Corporation) to which two columns of GMH-HR-H (made by Tosoh Corporation) were connected. Detection was carried out by using a differential refractometer, RI-8020 (made by Tosoh Corporation).

(13) State of Co-coagulation

A transparent state in which silica was not found at all in ceram after co-coagulation was designated as ○, a state in which some silica was suspended was designated as □ and a state in which silica was substantially suspended and not transparent was designated as ×.

(14) Filtration Performance

A solid-containing aqueous solution was fed into a mesh sieve with an opening of 212 μm, and solids remaining on or below the sieve were determined for the respective dry weights to obtain the passing weight rate. A smaller rate showed a greater size of the co-coagulation product or a higher yield.

A filter paper for quantitative analysis (No. 5A made by Advantec Toyo Kaisha, Ltd.) was used to filtrate a co-coagulation liquid to determine the time necessary for filtration (filtration time: second).

Example 1 for Producing Rubber Latex

Two hundred parts of deionized water, 1.5 parts of rosin acid soap, 2.1 parts of a fatty acid soap, 72 parts of 1,3-butadiene (monomer), 28 parts of styrene and 0.20 part of t-dodecyl mercaptan were fed into a pressure-resistant reactor vessel equipped with an agitator. The reactor vessel was kept at 10° C., and 0.03 parts of diisopropylbenzene hydroperoxide and 0.04 parts of sodium formaldehyde/sulfoxylate as a polymerization initiator, 0.01 parts of sodium ethylenediaminetetraacetate and 0.03 parts of ferric sulfate were added to the reactor vessel to initiate polymerization. At the time the polymerization conversion rate reached 45%, 0.05 parts of t-dodecyl mercaptan was added to continue the reaction. At the time the polymerization conversion rate reached 70%, 0.05 parts of diethylhydroxylamine were added to discontinue the reaction.

After unreacted monomers were removed by steam distillation, 30% by weight of an aqueous emulsified solution of 0.8 part of octadecyl-3-(3,5-di-t-butyl4-hydroxyphenyl)propionate and 0.12 parts of 2,4-bis(n-octylthiomethyl)--6-methylphenol as antioxidants were added to 100 parts of the polymer to obtain a polymerized latex with a solid concentration of 24% by weight (hereinafter referred to as La 1).

A part of the polymerized latex was taken out and adjusted for pH so as to fall into a range of 3 to 5 with sulfuric acid. Sodium chloride was added to effect coagulation of the polymerized latex at 50° C. to obtain a cram-like polymer. The cram was dried by a hot-air dryer at 80° C. to obtain a solid rubber (hereinafter referred to as Ru1). In the thus obtained rubber, the styrene content was 23.6% by weight and Mooney viscosity was 52. Further, the molecular weight was 415,000 and the molecular weight distribution was 3.74. The solid rubber (Ru 1) was used in Examples 4 and 5 and in Comparative examples 1, 6 and 10.

Example 2 for Producing Rubber Latex 200 parts of deionized water, 1.5 parts of a rosin acid soap, 2.1 parts of a fatty acid soap, 57.5 parts of 1,3-butadiene (monomer), 42.5 parts of styrene and 0.09 part of t-dodecyl mercaptan were fed into a pressure-resistant reactor vessel equipped with an agitator. The reactor vessel was kept at 10° C., and 0.1 parts of diisopropylbenzene hydroperoxide and 0.06 parts of sodium formaldehyde/sulfoxylate as a polymerization initiator, 0.014 part of sodium ethylenediaminetetraacetic acid and 0.02 parts of ferric sulfate were added to the reactor vessel to initiate polymerization. At the time the polymerization conversion rate reached 45%, 0.05 parts of t-dodecyl mercaptan was added to continue the reaction. At the time the polymerization conversion rate reached 70%, 0.05 parts of diethylhydroxylamine was added to discontinue the reaction.

After unreacted monomers were removed by steam distillation, 60% by weight an aqueous emulsified solution of 0.21 parts of N-(1,3-dimethylbutyl)-N'-phenyl-p-phenylene-diamine and 0.14 part of 2,2,4-trimethyl-1,2-dihydroquinoline as an antioxidants were added to 100 parts of polymer to obtain a polymerized latex with a solid concentration of 24% by weight (hereinafter referred to as La 2). A part of the polymerized latex was taken out and adjusted for pH so as to fall into the range of 3 to 5 with sulfuric acid. Sodium chloride was added to effect coagulation of the polymerized latex at 50° C. to obtain a cram-like polymer. The cram was dried by a hot-air dryer at 80° C. to obtain a solid rubber. In the thus obtained rubber, a styrene content was 35.0% by weight and Mooney viscosity was 150. Further, the molecular weight was 892,00 and the molecular weight distribution was 3.80.

A part of the above polymerized latex (hereinafter referred to as La 2) was taken out, and 37.5 parts of 66% by weight of an aqueous solution of Enerthene 1849A (made by British Petroleum) emulsified with a fatty acid soap was added as an extension oil to 100 parts of the polymer in the polymerized latex. Then, the pH was adjusted with sulfuric acid so as to fall into the range of 3 to 5 and sodium chloride was added to effect coagulation of the polymerized latex containing the extension oil at 60° C. to obtain a cram-like polymer. The cram was dried by a hot-air dryer at 80° C. to obtain the solid rubber (Ru 2) with Mooney viscosity of 49. The solid rubber (Ru 2) was used in Comparative example 9.

Example 1 for Producing Silica

A 230 liter of an aqueous solution of sodium silicate ($SiO_2$ concentration: 10 g/L, mole ratio: $SiO_2/Na_2O=3.41$) was fed to a stainless steel reactor vessel having a capacity of 1 $m^3$ equipped with a temperature-regulator, and heated up to 85° C. Then, 73 L of 22% by weight sulfuric acid and 440 L of an aqueous solution of sodium silicate ($SiO_2$ concentration: 90 g/L, mole ratio: $SiO_2/Na_2O=3.41$) were fed at the same time over 120 minutes. After the lapse of 10-minute for aging, 16 L of 22% by weight sulfuric acid was fed over 15 minutes. The above reaction was conducted at a constant temperature of 85° C., with the reaction solution agitated continuously, to obtain a silica slurry with a final pH 3.2 of the reaction solution. The slurry was washed with water and filtered through a filter press to obtain a wet cake of silica (A) with a solid content of 23%.

A part of the wet cake of silica (A) thus obtained was dried to give silica powder (a), a BET specific surface area ($S_{BET}$) of which was 201 $m^2/g$, a CTAB specific surface area ($S_{CTAB}$) was 190 $m^2/g$, and an oil absorption was 210 mL/100 g. The silica powder (a) obtained was used in Example 8 and Comparative Examples 1 and 2.

Example 2 for Producing Silica

A 200 L aqueous solution of sodium silicate ($SiO_2$ concentration: 10 g/L, molar ratio: $SiO_2/Na_2O=3.41$) was fed to a stainless steel reactor vessel having a capacity of 1 $m^3$ equipped with a temperature-regulator, and heated up to 95° C. Then, 77 L of 22% by weight sulfuric acid and 455 L of an aqueous solution of sodium silicate ($SiO_2$ concentration: 90 g/L, molar ratio: $SiO_2/Na_2O=3.41$) were fed at the same time over 140 minutes. After the lapse of 10-minute for aging, 16 L of 22% by weight sulfuric acid was fed over 15 minutes. The above reaction was conducted at a constant temperature of 95° C., while stirring the reaction solution continuously, to obtain a silica slurry with a final pH 3.2 of the reaction solution. The slurry was washed with water and filtered through a filter press to obtain a wet cake of silica (B) with solid content of 25% by weight.

A part of the wet cake of silica (B) thus obtained was dried to give silica powder (b), of which BET specific surface area ($S_{BET}$) was 121 $m^2/g$, CTAB specific surface area ($S_{CTAB}$) was 110 $m^2/g$, and oil absorption was 170 ml/100 g. The silica powder (b) was used in Comparative Examples 6 and 9.

Example 3 for Producing Silica

A 158 liter aqueous solution of sodium silicate ($SiO_2$ concentration: 10 g/L, molar ratio: $SiO_2/Na_2O=3.41$) was fed to a stainless reactor vessel having a capacity of 1 $m^3$ equipped with a temperature-regulator and heated up to 95° C. Then, 90 L of 22% by weight sulfuric acid and 535 L of an aqueous solution of sodium silicate ($SiO_2$ concentration: 90 g/L, mole ratio: $SiO_2/Na_2O=3.41$) were fed at the same time over 210 minutes. After the lapse of 10 minute for aging, 17 L of 22% by weight sulfuric acid was fed over 40 minutes. The above reaction was conducted at a constant temperature of 95° C., with the reaction solution agitated continuously, to obtain a silica slurry with a final pH 3.1 of the reaction solution. The slurry was washed with water and filtered through a filter press to obtain a wet cake of silica (C) with solid content of 28% by weight.

A part of the wet cake of silica (C) thus obtained was dried to obtain silica powder (c), whose BET specific surface area ($S_{BET}$) was 92 $m^2/g$, CTAB specific surface area ($S_{CTAB}$) was 85 m²/g, and oil absorption was 160 ml/100 g. The silica powder (c) was used in Comparative Example 10.

Examples I-XXIII for Preparing an Aqueous Dispersion of Silica

A homogenizer was used to mix the wet cakes of silica (A) through (C) or the silica powder (a) obtained by the above method with the cationic polymers enlisted in Tables 1 and 2 and pure water, while these wet cakes of silica and silica powder were pulverized, so that the concentration of silica in an aqueous dispersion may be given at 15% by weight and the rate of the cationic polymer to 100 parts by weight of silica (parts by weight) can be given as shown in Tables 1 and 2, thereby obtaining the cationic polymer-containing the aqueous dispersions of silica (I) to (=). The aqueous dispersions of silica (VII) and (XIII) were treated with a homogenizer and further treated once with a high-pressure homogenizer at 80 Mpa working pressure. Tables 1 and 2 show the mean particle sizes of the silica and pH values in the aqueous dispersion of the silica thus obtained.

Example 1

600 g of the aqueous dispersion of silica (I) and 2000 g of pure water were mixed and agitated, and 750 g of SBR latex (La 1) was added dropwise to the aqueous dispersion of silica (II), with stirring, to effect co-coagulation. After the aqueous dispersion was mixed, the pH was 7.3 and rubber was coagulated completely.

The coagulation product was filtered, washed with water and dried, and then treated through a roller to obtain 260 g of a sheet-form diene rubber composition.

Table 4 shows the filtration result, silica content and toluene-insoluble rubber content for 1 g of silica (gram per gram of silica) in the diene rubber composition. In toluene obtained by removing the toluene by the aid of an evaporator after determination of bound rubber, the rubber was dissolved in the toluene and determined for Mw and Mw/Mn, which were respectively 401,000 and 3.69.

A silane coupling agent (KBE-846 made by Shin-Etsu Chemical Co., Ltd.), paraffin wax, stearic acid, Chinese white and antioxidant (Nocrac 6C, Ouchishinko Chemical Industrial Co., Ltd.) were added to the rubber so that the resultant diene rubber composition might be shown in the proportion as shown in Table 3, and the mixture was kneaded for 2 minutes by the aid of a Banbury mixer (Laboplasto mill model 100C, mixer type B-250, made by Toyo Seiki Seisaku-sho, Ltd.). The temperature at the completion of kneading was 140° C. Then, a vulcanization accelerator (Nocceler C Z, Ouchishinko Chemical Industrial Co., Ltd.) and sulfur were further added so that the proportion of the rubber composition might be shown as in Table 3, and the mixture kneaded at 70° C. for 1 minute by the aid of a Banbury mixer to obtain a cross-linkable rubber composition. Table 4 shows toluene-insoluble rubber content (gram per gram of silica) for 1 g of silica in the resultant cross-linked rubber composition.

The cross-linkable rubber composition thus obtained was subjected to press cross-linking at 160° C. for 15 minutes to prepare test specimens, which were used to determine individual physical properties. Determined values were expressed by an index in which the Comparative Example 1 was designated as 100, the result of which is shown in Table 4.

Example 2

600 g of an aqueous dispersion of silica (II) and 2000 g of pure water were mixed and agitated, and 750 g of SBR latex (La 1) was added dropwise to the aqueous dispersion of silica (II)under agitation. After mixing, the pH was 8.0. Since complete coagulation of the rubber was not attained, sulfuric acid was added to complete the co-coagulation. At that time, the pH was 6.2.

The coagulation product was filtered, washed with water, dried, and then processed through a roller into a sheet-like diene rubber composition (252 g). Table 4 shows the filtration result, silica content and toluene-insoluble rubber content for 1 g of silica (gram per gram of silica) in the diene rubber composition.

Various additives were added to the diene rubber composition thus obtained so that the composition might be shown in the proportion as shown in Table 3, and the resultant mixture was kneaded, as in Example 1, to obtain a cross-linkable rubber composition. Table 4 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed by an index in which Comparative Example 1 was designated as 100, the result of which is shown in Table 4.

Example 3

Co-coagulation was carried out as in Example 1, except that an aqueous dispersion of silica (III) was used in place of the aqueous dispersion of silica (I) in Example 1. After mixing, the pH was 6.5 and the rubber coagulated completely.

Then, the coagulation product was filtered, washed with water, dried and then processed through a roller into diene rubber composition (252 g). Table 4 shows the filtration result, silica content and toluene-insoluble rubber content for 1 g of silica (gram per gram of silica) in the diene rubber composition.

Various additives were incorporated into the diene rubber composition so that the composition-might have the proportion as shown in Table 3, and the resultant mixture was kneaded, as in Example 1, to obtain a cross-linkable rubber composition. Table 3 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which Comparative Example 1 was designated as 100, the result of which is shown in Table 4.

Example 4

Co-coagulation was carried out as in Example 1 except that the amount of the aqueous dispersion of silica (I) was 1200 g in Example 1. After mixing, pH was 6.1 and the rubber was coagulated completely.

Then, the coagulation product was filtered, washed with water, dried and then processed through a roller_to obtain a diene rubber composition (340 g). Table 4 shows the filtration result, silica content and toluene-insoluble rubber content for 1 g of silica (gram per gram of silica) in the diene rubber composition.

A solid rubber (Ru 1) and various additives were incorporated into the diene rubber composition so that the composition might have the proportion as shown in Table 3, and the resultant mixture was kneaded, as in Example 1 to obtain a cross-linkable rubber composition. Table 4 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed by an index in which Comparative Example 1 was designated as 100, the result of which is shown in Table 4.

Example 5

Co-coagulation was carried out, as in Example 1, except that the aqueous dispersion of silica (I) in Example 1 was 1800 g. After mixing, the pH was 5.8 and the rubber was coagulated completely.

Then, the coagulation product was filtered, washed with water, dried and then processed through a roller to obtain a diene rubber composition (440 g). Table 4 shows the filtration result, silica content and toluene-insoluble rubber content for 1 g of silica (gram per gram of silica) in the diene rubber composition.

A solid rubber (Ru 1) and various additives were incorporated into the diene rubber composition so that the composition might have the proportion as shown in Table 3, and the resultant mixture was kneaded, as in Example 1, to obtain a cross-linkable rubber composition. Table 4 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 1 was designated as 100, the result of which is shown in Table 4.

Example 6

Co-coagulation was carried out, as in Example 1, except that an aqueous dispersion of silica (IV) was used in place of the aqueous dispersion of silica (I) used in Example 1. After mixing, the pH was 7.2 and the rubber was coagulated completely.

Then, the coagulation product was filtered, washed with water, dried and then processed through a roller to obtain a diene rubber composition (252 g). Table 4 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1, to obtain a cross-linkable rubber composition. Table 4 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 1 was designated as 100, the result of which is shown in Table 4.

Example 7

Co-coagulation was carried out, as in Example 1, except that an aqueous dispersion of silica (V) was used in place of the aqueous dispersion of silica (I) used in Example 1. After mixing, the pH was 6.9 and the rubber was coagulated completely.

Then, the coagulation product was filtered, washed with water, dried and then processed through a roller to obtain a diene rubber composition (G) (252 g). Table 4 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1, to obtain a cross-linkable rubber composition. Table 4 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 1 was designated as 100, the result of which is shown in Table 4.

Example 8

Co-coagulation was carried out, as in Example 1, except that an aqueous dispersion of silica (VI) was used in place of the aqueous dispersion of silica (I) used in the Example 1. After mixing, the pH was 7.2 and the rubber was coagulated completely.

Then, the coagulation product was filtered, washed with water, dried and then processed through a roller to obtain a diene rubber composition (252 g). Table 4 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1, to obtain a cross-linkable rubber composition. Table 4 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which Comparative Example 1 was designated as 100, the result of which is shown in Table 4.

Comparative Example 1

Solid rubber (Ru 1), silica powder (a) and various additives were added to the diene rubber composition so that the composition might have the proportion as shown in Table 3, and the resultant mixture was kneaded, as in Example 1, to obtain a cross-linkable rubber composition. Table 5 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical property. Determined values were expressed in terms of an index in which the Comparative example 1 was designated as 100, the result of which is shown in Table 5.

Comparative Example 2

7.5 grams of γ-mercaptopropylethoxysilane (KBE-803, made by Shin-Etsu Chemical Co., Ltd.), 5.0 g of isopropanol and 10 g of water were mixed and pH of the mixture was adjusted to 4 by addition of glacial acetic acid. Then, the mixed liquid was stirred at room temperature for 20 minutes until it became transparent to obtain an aqueous solution of silane.

The resultant aqueous solution of silane was intermittently added under agitation to an aqueous dispersion of silica which has been prepared by mixing and dispersing 125 g of silica powder (a) into 800 g of pure water, and pH of the aqueous dispersion was adjusted to 7.7 by addition of 25% sodium hydroxide. The above liquid mixture was then kept at 70° C. and agitated for 4 hours to form an aqueous dispersion of silica treated with the organic silicon compound. The mean particle size of silica in the resultant aqueous dispersion of silica was 20 μm.

Then, 1045 g of SBR latex (La 1) was mixed with the above aqueous dispersion of silica to effect co-coagulation by addition of sodium chloride under acidic conditions.

The coagulation product was collected by filtration, washed with water, dried and then processed through a roller to obtain a sheet-like diene rubber composition (360 g). Table 5 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1, to obtain a cross-linkable rubber composition. Table 5 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative Example 1 was designated as 100, the result of which is shown in Table 5.

Comparative Example 3

Co-coagulation was carried out, as in Example 1, except that an aqueous dispersion of silica (I) was 300 g in the Example 1. After mixing, the pH became 5.2 and the rubber was coagulated completely.

Then, the coagulation product was collected by filtration, washed with water, dried and then processed through a roller to obtain a diene rubber composition (600 g). Table 5 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and an attempt was made to knead the resultant mixture, as in Example 1 but failed, due to an excessive hardness of the diene rubber composition.

Comparative Example 4

An operation of the co-coagulation was carried out, as in Example 1, except that an aqueous dispersion of silica (VII) was used in place of the aqueous dispersion of silica (I) used in the Example 1. After mixing, the pH was 4.8 and the rubber was coagulated completely.

Then, the coagulation product was collected by filtration, washed with water, dried and then processed through a roller to obtain a diene rubber composition (252 g). Table 5 shows the filtration result, silica content and toluene-insoluble rubber content for 1 g of silica (gram per gram of silica) in the diene rubber composition.

SBR and various additives were incorporated into the diene rubber composition so that the composition might have the proportion as shown in Table 3, and the resultant mixture was kneaded, as in Example 1, to obtain a cross-linkable rubber composition. Table 5 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 1 was designated as 100, the result of which is shown in Table 5.

Comparative Example 5

A homogenizer was used to pulverize and mix the above wet cake of silica (A) so that the concentration of silica might be 15% in the aqueous dispersion, thereby obtaining an aqueous dispersion of silica. 600 g of an aqueous dispersion of silica, 2000 g of pure water and 750 g of SBR latex (La 1) were mixed under agitation to obtain a liquid mixture. Then, 27 g of 10% by weight aqueous solution of epichlorohydrin/dimethylamin copolymer (molecular weight, 240,000) was added dropwise slowly to the mixture under agitation, to effect co-coagulation. After mixing, the pH was 7.3.

The coagulation product was filtered, washed with water, dried and then processed through a roller to obtain a diene rubber composition (260 g).

Table 5 shows the filtration result, silica content and toluene-insoluble rubber content for 1 g of silica (gram per gram of silica) in the diene rubber composition.

The resultant diene rubber composition was kneaded as in Example 1 to obtain a cross-linkable rubber composition. Table 5 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which Comparative Example 1 was designated as 100, the result of which is shown in Table 5.

Example 9

An operation of the co-coagulation was effected, as in Example 1, except that an aqueous dispersion of silica (VIII) was used in place of the aqueous dispersion of silica (I) used in Example 1. After mixing, the pH was 7.5 and the rubber was coagulated completely.

The coagulation product was collected by filtration, washed with water, dried and then processed through a roller to obtain a diene rubber composition (252 g). Table 6 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1 to obtain a cross-linkable rubber composition. Table 6 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative Example 6 was designated as 100, the result of which is shown in Table 6.

Example 10

600 g of an aqueous dispersion of silica (VIII) was diluted with 2000 g of pure water and heated up to 50° C. Then, 22% by weight sulfuric acid was used to keep pH of the above water dispersion within thee range from 3 to 5, and 750 g of SBR latex (La 1) was added dropwise under agitation to effect co-coagulation whereby coagulation product of diene rubber composition was obtained. The temperature on coagulation was maintained at 50° C.

The coagulation product was collected by filtration, washed with water and dried to obtain a diene rubber composition (260 g). Table 6 shows the filtration result, silica content and toluene-insoluble rubber content for 1 g of silica (gram per gram of silica) in the diene rubber composition.

Various additives were incorporated into the diene rubber composition so that the composition_might have the proportion as shown in Table 3, and the resultant mixture was kneaded, as in Example 1, to obtain a cross-linkable rubber composition. Table 6 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative Example 6 was designated as 100, the result of which is shown in Table 6.

Example 11

750 g of SBR latex (La 1) was diluted with 2000 g of pure water and heated up to 50° C. At this time, the pH was 9.8. Then, 600 g of an aqueous dispersion of silica (VIII) was added to the above-diluted SBR latex (La 1), with stirring to produce a co-coagulation product consisting of silica and rubber. After mixing, the pH was 7.5. Since rubber of the SBR latex (La 1) was not completely coagulated, 10% by weight sulfuric acid was then added to the above liquid mixture whereby the rubber was completely coagulated to obtain a coagulation product of a diene rubber composition. The final pH of the mixture was 6.5.

The coagulation was effected, while the liquid mixture was maintained at 50° C.

The coagulation product was collected by filtration, washed with water and dried to obtain 260 g of a diene rubber composition. Table 6 shows the filtration result, silica content and toluene-insoluble rubber content for 1 g of silica (gram per gram of silica) in the diene rubber composition.

A variety of additives were incorporated into the diene rubber composition so that the composition might have the proportion as shown in Table 3, and the resultant mixture was kneaded, as in Example 1, to obtain a cross-linkable rubber composition. Table 6 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 6 was designated as 100, the result of which is shown in Table 6.

Example 12

750 g of SBR latex was with 2000 g of pure water and heated up to 50° C. At this time, the pH was 9.8. Then, 600 g of an aqueous dispersion of silica (IX) was added to the above-diluted SBR latex (La 1), with stirring to produce a co-coagulation product consisting of silica and rubber. The pH of the liquid mixture was 8.5. Rubber of the SBR latex (La 1) was not completely coagulated and 10% by weight sulfuric acid was then added to the above liquid mixture whereby the rubber was completely coagulated to obtain a coagulation product of the diene rubber composition. The final pH of the mixture solution was 6.5. The coagulation was effected, while the mixture was maintained at 50° C.

The coagulation product was collected by filtration, washed with water and dried to obtain 255 g of the diene rubber composition. Table 6 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1, to obtain a cross-linkable rubber composition. Table 6 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative Example 6 was designated as 100, the result of which is shown in Table 6.

Example 13

750 g of SBR latex (La 1) was diluted with 2000 g of pure water and heated up to 50° C. At this time, the pH was 9.8. Then, 600 g of an aqueous dispersion of silica (X) was added to the above-diluted SBR latex, with stirring, to produce a co-coagulation product consisting of silica and rubber. The pH of the liquid mixture was 7.5. Since rubber of the SBR latex (La 1) was not completely coagulated, 10% by weight sulfuric acid was then added to the above mixture whereby the rubber was completely coagulated to obtain a coagulation product of the diene rubber composition. The final pH of the mixture was 6.5. The coagulation was carried out while the mixture was maintained at 50° C.

The coagulation product was collected by filtration, washed with water and dried to obtain a diene rubber composition (261 g). Table 6 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1, to obtain a cross-linkable rubber composition. Table 6 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 6 was designated as 100, the result of which is shown in Table 6.

Example 14

750 g of SBR latex (La 1) was diluted with 2000 g of pure water and heated up to 50° C. At this time, the pH was 9.8. Then, 600 g of an aqueous dispersion of silica (XI) was added to the above-diluted SBR latex, with stirring, to produce a co-coagulation product consisting of silica and rubber. The pH of the mixture solution was 7.5. As rubber of the SBR latex (La 1) was not completely coagulated, 10% by weight sulfuric acid was then added to the above mixture whereby the rubber was completely coagulated to obtain a coagulation product of a diene rubber composition. The final pH of the mixture was 6.5. The coagulation was effected, while the mixture was kept at 50° C.

The coagulation product was collected by filtration, washed with water and dried to obtain a diene rubber composition (251 g). Table 6 shows the filtration result, silica content and a toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1 to obtain a cross-linkable rubber composition. Table 6 shows a toluene-insoluble rubber content for 1 g of silica (gram per gram of silica) in the cross-linkable rubber composition. The cross-linkable rubber composition was subjected to cross-linking as in the Example 1 to prepare test specimens, which were used to determine individual physical properties. Determined values were expressed in terms of an index in which the Comparative Example 6 was designated as 100, the result of which is shown in Table 6.

Example 15

750 g of SBR latex (La 1) and 600 g of an aqueous dispersion of silica (VIII) were added at the same time, with stirring, to 2000 g of pure water heated up to 50° C. to produce a co-coagulation product consisting of silica and rubber. The pH of the liquid mixture solution was 7.5. As rubber of the SBR latex (La1) was not completely coagulated, 10% by weight sulfuric acid was then added to the above mixture, whereby the rubber was completely coagulated to obtain a coagulation product of a diene rubber composition. The final pH of the mixture solution was 6.3. The coagulation was carried out, while the mixture was maintained at 50° C.

The coagulation product was collected by filtration, washed with water and dried to obtain 258 g of a diene rubber composition. Table 6 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1, to obtain a cross-linkable rubber composition. Table 6 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 6 was designated as 100, the result of which is shown in Table 6.

Comparative Example 6

SBR (Ru 1), silica powder (b) and various additives were incorporated into the diene rubber composition so that the composition might have the proportion as shown in Table 3, and the resultant mixture was kneaded, as in Example 1, to obtain a cross-linkable rubber composition. Table 7 shows a toluene-insoluble rubber content for 1 g of silica (gram per gram of silica) in the cross-linkable rubber composition. The cross-linkable rubber composition was subjected to cross-linking-as in Example 1 to prepare test specimens, which were used to determine individual physical properties. Determined values were expressed in terms of an index in which the Comparative Example 6 was designated as 100, the result of which is shown in Table 7.

Comparative Example 7

An operation similar to Examples for producing aqueous dispersion of silica was carried out except that the wet cake (B) used in Example 9 was used and cetyltrimethylammonium bromide was used so that the amount thereof might become 3% by weight of the silica, whereby an aqueous dispersion of silica (XIV) containing cetyltrimethylammonium bromide was obtained. An average particle size of the silica in the resulting aqueous dispersion was 16 μm.

The aqueous dispersion of silica (XIV) in an amount of 600 g was then diluted with 2000 g of pure water and heated up to 50° C. To the aqueous dispersion was then added dropwise 750 g of an SBR latex (LA 1) under agitation to effect co-coagulation while the aqueous dispersion was maintained at a pH of 3-5 with the addition of 22% sulfuric acid, whereby a coagulated solid of a diene rubber composition was obtained. The temperature on coagulation was maintained at 50° C.

The coagulation product was collected by filtration, washed with water and dried to obtain 246 g of a diene rubber composition. Table 7 shows the filtration result, silica content and a toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1 to obtain a cross-linkable rubber composition. Table 7 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 6 was designated as 100, the result of which is shown in Table 7.

Comparative Example 8

The aqueous dispersion of silica (XIV) in an amount of 600 g was then diluted with 2000 g of pure water and heated up to 50° C. To the aqueous dispersion was then added dropwise 750 g of an SBR latex (La 1) under agitation to perform co-coagulation while the aqueous dispersion was maintained at a pH of 3-5 with the addition of 22% sulfuric acid, whereby a coagulated solid or a diene rubber composition was obtained. The temperature on coagulation was maintained at 50° C.

The coagulation product was collected by filtration, washed with water and dried to obtain 240 g of a diene rubber composition. Table 7 shows the filtration result, silica content and toluene-insoluble rubber content for 1 g of silica (gram per gram of silica) in the diene rubber composition.

Various additives were incorporated into the diene rubber composition so that the composition might have the proportion as shown in Table 3, and the resultant mixture was kneaded, as in Example 1 to obtain a cross-linkable rubber composition. Table 7 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative Example 6 was designated as 100, the result of which is shown in Table 7.

Example 16

750 Grams of the SBR (La 2) and 102 g of a 66% by weight of aqueous emulsified solution (referred to hereinafter as oil emulsion) of Enerthenel 1849A (produced by British Petroleum) with a fatty acid soap were mixed and the mixture was then diluted with 2000 g of pure water and warmed up to 50° C. A pH value of the aqueous emulsion was 10.2. To the diluted SBR latex (La 2) containing Enerthenel 1849A was added dropwise to 840 g of the silica dispersion (XI) under agitation to form a co-coagulation product of the silica and the rubber, whereby a pH value of the mixed liquid was 7.4. As the rubber in the SBR latex (La 2) was not entirely coagulated, 10% sulfuric acid was added to the mixed liquid to coagulate the rubber entirely thereby obtaining a coagulated solid of the diene rubber composition. A final pH value of the mixed liquid was 6.3. By the way, the temperature of the mixed liquid was always maintained at 50° C. The coagulated solid was collected by filtration, washed with water and dried to obtain 365 g of the diene rubber composition. Table 8 shows the filtration result, silica content and toluene-insoluble rubber content for 1 g of silica (gram per gram of silica) in the diene rubber composition.

A rubber obtained by removing toluene from a toluene solution remaining in a bound rubber measuring device by the aid of an evaporator had a molecular weight of 865,000 and a Mw/Mn ratio of 3.7.

Various additives were incorporated into the resultant diene rubber composition so that the composition might have the proportion as shown in Table 3, and the resultant mixture was kneaded, as in Example 1 to obtain a cross-linkable rubber composition. Table 8 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative example 9 was designated as 100, the result of which is shown in Table 8.

Comparative Example 9

The solid rubber (Ru 2), the silica powder (b) and various additives were incorporated into the diene rubber composition so that the composition might have the proportion as shown in Table 3, and the resultant mixture was kneaded, as in Example 1, to obtain a cross-linkable rubber composition. Table 8 shows a toluene-insoluble rubber content for 1 g of silica (gram per gram of silica) in the cross-linkable rubber composition. The cross-linkable rubber composition was subjected to cross-linking as in the Example 1 to prepare test specimens, which were used to determine individual physical properties. Determined values were expressed in terms of an index in which the Comparative Example 9 was designated as 100, the result of which is shown in Table 8.

Example 17

A co-coagulation operation was carried out in the same manner as in Example 1 except that an aqueous dispersion of silica (XII) was used in place of the aqueous dispersion of silica (I) used in the Example 1. After mixing, the pH was 7.2 and the rubber was coagulated completely.

Then, the coagulation product was collected by filtration, washed with water, dried and then processed through a roller to obtain a diene rubber composition (252 g). Table 8 shows the filtration result, silica content and toluene-insoluble rubber content for 1 g of silica (gram per gram of silica) in the diene rubber composition.

Various additives were added to the diene rubber composition so that the composition might have the proportion as shown in Table 3, and the resultant mixture was kneaded, as in Example 1, to obtain a cross-linkable rubber composition. Table 8 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed by an index in which the Comparative example 10 was designated as 100, the result of which is shown in Table 8.

Comparative Example 10

Solid rubber (Ru 1), silica powder (c) and various additives were incorporated into the diene rubber composition so that the composition might have the proportion as shown in Table 3, and the resultant mixture was kneaded, as in Example 1, to obtain a cross-linkable rubber composition. Table 8 shows a toluene-insoluble rubber content for 1 g of silica (gram per gram of silica) in the cross-linkable rubber composition. The cross-linkable rubber composition was subjected to cross-linking as in Example 1 to prepare test specimens, which were used to determine individual physical properties. Determined values were expressed in terms of an index in which the Comparative Example 10 was designated as 100, the result of which is shown in Table 8.

EFFECTS OF THE INVENTION

As is apparent from the foregoing explanations, it is evident that the diene rubber composition of the present invention having a system comprising a diene rubber of a broad distribution of the molecular weight, silica and a cationic polymer contains a specific amount of bound rubber so that the composition excels in molding processability and that a diene type cross-linkable rubber composition derived from the diene rubber composition possesses excellent physical properties such as tensile strength and wear resistance, especially compatible characteristics of fuel efficiency and gripping property for use in automobile tires.

INDUSTRIAL APPLICABILITY

Accordingly, the diene rubber composition of the present invention finds versatile applications utilizing the aforesaid characteristics, for example, utilization for various parts of tires, such as tread, carcass, side wall and bead, utilization for rubber products such as hose, window frame, belt, shoe sole, vibration-absorbing rubber and the like automobile parts and utilization for resin-reinforced rubber such as crush-proof polystyrene and ABS resin.

Above all, the diene rubber composition of the present invention is particularly suited as tire parts.

TABLE 1

| | | Aqueous dispersion of silica | | | | | | |
|---|---|---|---|---|---|---|---|---|
| | | I | II | III | IV | V | VI | VII |
| Wet cake of silica | | A | A | A | A | A | — | A |
| Silica powder | | — | — | — | — | — | a | — |
| Cationic polymers | Polydiallylmethyl ammonium chloride (Weight-average molecular weight: 20,000) Cation-equivalent molecular weight, 148 | 3 | 1.5 | 5 | — | — | 3 | 10 |
| | Polydiallyldimethyl ammonium chloride (Weight-average molecular weight: 40,000) Cation-equivalent molecular weight, 162 | — | — | — | 3 | — | — | — |
| | Polyallyl ammonium chloride (Weight-average molecular weight: 40,000) Cation-equivalent molecular weight, 94 | — | — | — | — | 3 | — | — |
| pH | | 3.7 | 4.0 | 3.5 | 3.6 | 3.6 | 3.7 | 3.3 |
| Average particle size of silica (μm) | | 15 | 16 | 15 | 16 | 16 | 17 | 1.2 |

TABLE 2

| | | Aqueous dispersion of silica | | | | | |
|---|---|---|---|---|---|---|---|
| | | VIII | IX | X | XI | XII | XIII |
| Wet cake of silica | | B | B | B | B | C | B |
| Silica powder | | — | — | — | — | — | — |
| Cationic polymers | Polydiallylmethyl ammonium chloride (Weight-average molecular weight: 20,000) Cation-equivalent molecular weight, 148 | 3 | 1.5 | — | — | 3 | 3 |
| | Polydiallyldimethyl ammonium chloride (Weight-average molecular weight: 20,000) Cation-equivalent molecular weight, 162 | — | — | 3 | — | — | — |
| | Epichlorohydrin/dimethylamine copolymer (Weight-average molecular weight: 240,000) Cation-equivalent molecular weight, 138 | — | — | — | 3 | — | — |
| pH | | 3.7 | 4.0 | 3.5 | 3.6 | 3.6 | 3.7 |
| Average particle size of silica (μm) | | 15 | 16 | 15 | 16 | 16 | 17 |

TABLE 3

| | Unit | Example 1-3, 6-15, 17 Comparative examples 3-5, 7, 8 | Example 4 | Example 5 | Example 16 | Comparative examples 1, 6, 10 | Comparative example 2 | Comparative example 9 |
|---|---|---|---|---|---|---|---|---|
| Diene rubber composition | phr | 150 | 100 | 83 | 207.5 | — | 150 | — |
| Solid rubber | phr | — | 50 | 67 | — | 100 | — | 137.5 |
| Silica powder | phr | — | — | — | — | 50 | — | 70 |
| Silane coupling agent | phr | 5 | 5 | 5 | 5 | 5 | — | 5 |
| Paraffin wax | phr | 1 | 1 | 1 | 1 | 1 | 1 | 1 |
| Stearic acid | phr | 2 | 2 | 2 | 2 | 2 | 2 | 2 |
| Chinese white | phr | 4 | 4 | 4 | 4 | 4 | 4 | 4 |
| Antioxidant | phr | 1 | 1 | 1 | 1 | 1 | 1 | 1 |
| Vulcanization accelerator | phr | 1.5 | 1.5 | 1.5 | 1.5 | 1.5 | 1.5 | 1.5 |
| Sulfur | phr | 2 | 2 | 2 | 2 | 2 | 2 | 2 |

TABLE 4

|  |  | Example 1 | Example 2 | Example 3 | Example 4 | Example 5 | Example 6 | Example 7 | Example 8 |
|---|---|---|---|---|---|---|---|---|---|
| Filtration property | State of co-coagulation | ○ | ○ | ○ | ○ | ○ | ○ | ○ | ○ |
|  | Passing weight percentage (%) | 55 | 60 | 53 | 72 | 78 | 52 | 53 | 49 |
|  | Filtration time (second) | 30 | 40 | 35 | 100 | 120 | 28 | 38 | 24 |
| Silica content (part by weight) |  | 50 | 51 | 50 | 99 | 149 | 51 | 49 | 51 |
| S/c |  | 63 | 127 | 38 | 63 | 63 | 63 | 63 | 63 |
| Toluene-insoluble content (gram per gram of silica) | Diene rubber composition | 0.50 | 0.43 | 0.56 | 0.60 | 0.51 | 0.51 | 0.49 | 0.45 |
|  | Cross-linked rubber composition | 0.57 | 0.51 | 0.62 | 0.53 | 0.59 | 0.60 | 0.55 | 0.52 |
| Physical property of vulcanized rubber | Mooney viscosity | 85 | 95 | 87 | 86 | 88 | 84 | 89 | 92 |
|  | 300% modulus | 115 | 108 | 116 | 113 | 111 | 116 | 107 | 110 |
|  | Tensile strength | 125 | 110 | 128 | 123 | 120 | 126 | 120 | 118 |
|  | Gripping property | 115 | 112 | 114 | 116 | 117 | 116 | 120 | 116 |
|  | Fuel efficiency | 87 | 88 | 90 | 88 | 91 | 85 | 88 | 85 |
|  | Wear resistance | 125 | 109 | 130 | 128 | 122 | 128 | 110 | 113 |

TABLE 5

|  |  | Comparative example 1 | Comparative example 2 | Comparative example 3 | Comparative example 4 | Comparative example 5 |
|---|---|---|---|---|---|---|
| Filtration property | State of co-coagulation | — | Δ | ○ | ○ | ○ |
|  | Passing weight percentage (%) | — | 51 | 85 | 72 | 42 |
|  | Filtration time (second) | — | 35 | 250 | 320 | 30 |
| Silica content (part by weight) |  | — | 48 | 247 | 48 | 49 |
| S/c |  | — | — | 63 | 19 | 63 |
| Toluene-insoluble content (gram per gram of silica) | Diene rubber composition | — | 1.20 | 0.32 | 1.12 | 0.18 |
|  | Cross-linked rubber composition | 0.20 | 1.33 | — | 1.20 | 0.24 |
| Physical property of vulcanized rubber | Mooney viscosity | 100 | 115 | — | 110 | 96 |
|  | 300% modulus | 100 | 105 | — | 106 | 106 |
|  | Tensile strength | 100 | 110 | — | 116 | 110 |
|  | Gripping property | 100 | 88 | — | 101 | 105 |
|  | Fuel efficiency | 100 | 100 | — | 98 | 95 |
|  | Wear resistance | 100 | 110 | — | 104 | 108 |

TABLE 6

|  |  | Example 9 | Example 10 | Example 11 | Example 12 | Example 13 | Example 14 | Example 15 |
|---|---|---|---|---|---|---|---|---|
| Filtration property | State of co-coagulation | ○ | ○ | ○ | ○ | ○ | ○ | ○ |
|  | Passing weight percentage (%) | 15 | 30 | 1.3 | 2.5 | 2.0 | 1.5 | 1.2 |
|  | Filtration time (second) | 25 | 45 | 10 | 15 | 18 | 11 | 1.1 |
| Silica content (part by weight) |  | 50 | 50 | 50 | 50 | 50 | 50 | 50 |
| S/c |  | 37 | 37 | 37 | 37 | 37 | 37 | 37 |
| Toluene-insoluble content (gram per gram of silica) | Diene rubber composition | 0.42 | 0.41 | 0.40 | 0.36 | 0.45 | 0.42 | 0.42 |
|  | Cross-linked rubber composition | 0.53 | 0.52 | 0.52 | 0.48 | 0.55 | 0.52 | 0.52 |
| Physical property of vulcanized rubber | Mooney viscosity | 88 | 89 | 88 | 94 | 89 | 87 | 89 |
|  | 300% modulus | 117 | 119 | 120 | 115 | 120 | 120 | 121 |
|  | Tensile strength | 121 | 120 | 118 | 111 | 119 | 119 | 117 |
|  | Gripping property | 115 | 116 | 118 | 109 | 109 | 115 | 117 |
|  | Fuel efficiency | 92 | 91 | 90 | 94 | 91 | 89 | 90 |
|  | Wear resistance | 127 | 121 | 130 | 120 | 129 | 127 | 126 |

TABLE 7

|  |  | Comparative example 6 | Comparative example 7 | Comparative example 8 |
|---|---|---|---|---|
| Filtration property | State of co-coagulation | — | Δ | ○ |
|  | Passing weight percentage (%) | — | 43 | 75 |
|  | Filtration time (second) | — | 110 | 370 |
| Silica content (part by weight) |  | — | 47 | 51 |
| S/c |  | — | 37 | 37 |

TABLE 7-continued

|  |  | Comparative example 6 | Comparative example 7 | Comparative example 8 |
|---|---|---|---|---|
| Toluene-insoluble content (gram per gram of silica) | Diene rubber composition | 0.18 | 0.13 | 1.12 |
|  | Cross-linked rubber composition | — | 0.20 | 1.31 |
| Physical property of vulcanized rubber | Mooney viscosity | 100 | 95 | 115 |
|  | 300% modulus | 100 | 106 | 108 |
|  | Tensile strength | 100 | 105 | 115 |
|  | Gripping property | 100 | 105 | 92 |
|  | Fuel efficiency | 100 | 98 | 104 |
|  | Wear resistance | 100 | 105 | 102 |

TABLE 8

|  |  | Example 16 | Comparative example 9 | Example 17 | Comparative example 10 |
|---|---|---|---|---|---|
| Filtration property | State of co-coagulation | ○ | — | ○ | — |
|  | Passing weight percentage (%) | 0.5 | — | 5 | — |
|  | Filtration time (second) | 11 | — | 15 | — |
| Silica content (part by weight) |  | 69 | — | 50 | — |
| S/c |  | 37 | — | 28 | — |
| Toluene-insoluble content (gram per gram of silica) | Diene rubber composition | 0.38 | — | 0.35 | — |
|  | Cross-linked rubber composition | 0.48 | 0.17 | 0.41 | 0.15 |
| Physical property of vulcanized rubber | Mooney viscosity | 92 | 100 | 88 | 100 |
|  | 300% modulus | 118 | 100 | 118 | 100 |
|  | Tensile strength | 110 | 100 | 120 | 100 |
|  | Gripping property | 110 | 100 | 112 | 100 |
|  | Fuel efficiency | 92 | 100 | 88 | 100 |
|  | Wear resistance | 126 | 100 | 125 | 100 |

What is claimed is:

1. A diene rubber co-coagulation product obtained by mixing and co-coagulating a diene rubber latex with silica which has been mixed with a cationic polymer, comprising 100 parts by weight of a diene rubber having a molecular weight distribution expressed in terms of a ratio of weight-average molecular weight to number-average molecular weight being 1.1 to 30, 20 to 200 parts by weight of silica and a cationic polymer, wherein a toluene-insoluble rubber content per gram of the silica is within the range from 0.2 to 1 g.

2. The diene rubber co-coagulation product as set forth in claim 1, wherein the specific surface area of the silica (unit: $m^2/g$) measured by the adsorption method using cetyl trimethyl ammonium bromide (CTAB) is 60 to 300 $m^2/g$.

3. The diene rubber co-coagulation product as set forth in claim 1, wherein 0.1 to 7.5 parts by weight of the cationic polymer is contained in relation to 100 parts by weight of the silica.

4. The diene rubber co-coagulation product as set forth in claim 1, wherein the specific surface area (unit: $m^2/g$) of the silica measured by the adsorption method using cetyl trimethyl ammonium bromide (CTAB) is 70 to 200 $m^2/g$ and the cationic polymer has been incorporated in an amount satisfying the following formula where S represents the specific surface area of the silica and c represents an amount (unit: part by weight) of the cationic polymer based on 100 parts by weight of the silica:

$$27 \leq (S/c) \leq 70.$$

5. The diene rubber co-coagulation product as set forth in claim 1, wherein the weight-average molecular weight of the cationic polymer is 1,000 to 1,000,000.

6. A cross-linkable diene rubber composition obtained by mixing a cross-linking agent and a silane coupling agent with the diene rubber co-coagulation product as set forth in claim 1.

7. A cross-linked diene rubber obtained by cross-linking the cross-likable diene rubber composition as set forth in claim 6.

8. A process for producing a diene rubber co-coagulation product, comprising:

mixing silica and a cationic polymer in water to obtain an aqueous dispersion, the silica having an average particle diameter of 1-40 μm;

mixing the aqueous dispersion with a diene rubber latex having a molecular weight distribution expressed in terms of the ratio of the weight-average molecular weight to the number-average molecular weight of 1.1 to 30 to effect co-coagulation of the silica with the rubber; and subjecting the co-coagulation product to dehydration followed by drying;

wherein the co-coagulation is carried out while the pH value upon mixing of the aqueous dispersion with the rubber latex is maintained within the range from 5 to 11;

wherein the pH value upon completion of the co-coagulation is adjusted within the range from 5 to 8; and wherein the co-coagulation a toluene-insoluble rubber content per gram of the silica that is within the range from 0.2 to 1 g.

* * * * *